United States Patent [19]

Deeg et al.

[11] 3,917,539

[45] *Nov. 4, 1975

[54] METHOD FOR PRODUCING LASER GLASSES HAVING HIGH RESISTANCE TO INTERNAL DAMAGE AND THE PRODUCT PRODUCED THEREBY

[75] Inventors: Emil W. Deeg, Woodstock, Conn.; Elias Snitzer, Wellesley, Mass.

[73] Assignee: American Optical Corporation, Southbridge, Mass.

[ * ] Notice: The portion of the term of this patent subsequent to Feb. 4, 1989, has been disclaimed.

[22] Filed: Aug. 13, 1970

[21] Appl. No.: 63,593

[52] U.S. Cl................... 252/301.4 R; 252/301.6 F
[51] Int. Cl.²......................................... C09K 11/08
[58] Field of Search............... 252/301.4 F, 301.6 F

[56] References Cited
UNITED STATES PATENTS 3,471,408  10/1969  Young.......................... 252/301.4 F Primary Examiner—Oscar R. Vertiz
Assistant Examiner—Michael L. Lewis
Attorney, Agent, or Firm—H. R. Berkenstock, Jr.; William C. Nealon

[57] ABSTRACT

Laser glass which has a low loss coefficient and is highly resistant to internal damage resulting from inclusions is produced in a ceramic crucible where the crucible and the associated ceramic stirrer are prepared such that the surfaces thereof are essentially free of reducing components.

5 Claims, No Drawings

METHOD FOR PRODUCING LASER GLASSES HAVING HIGH RESISTANCE TO INTERNAL DAMAGE AND THE PRODUCT PRODUCED THEREBY

CROSS-REFERENCES TO RELATED APPLICATIONS

This invention is an improvement over the invention disclosed in copending application, Ser. No. 801,800 filed Feb. 24, 1969, and now abandoned, by E. W. Deeg and R. E. Graf, and assigned to the assignee of the instant application.

BACKGROUND OF THE INVENTION

This invention is related to the production of laser glasses and is more particularly concerned with a method of producing laser glasses which highly resistant to inclusion type internal damage when utilized in laser configurations having high energy densities.

A laser is a source of a highly coherent, high intensity beam of electromagnetic radiation. The radiation is considered generally to be light although the output spectrum through which known laser materials emit ranges from the infrared to the ultra-violet. Many types of lasers are capable, in certain configurations, of emitting an output beam having a very high power density. These range from the very high average power continuous wave gas lasers to the Q-switched solid state lasers. The average power output is, of course, very different. However, the power density during operation is the parameter of present interest.

Most solid laser materials, glass and crystal, contain particles, both microscopically visible and submicroscopic, which are not homogeneous with the surrounding mass. Many of these microinhomogeneities are of the order of one micrometer in diameter or less and as such are not discernible by visual means. When a laser beam or other mode of high energy density radiation is generated therein or transmitted through the material, energy is absorbed by the material of the microinhomogeneity. These microinhomogeneities absorb energy at a faster rate and to a higher degree than does the surrounding material. Therefore, the small localized matter expands more quickly than does the matrix material until a fracture occurs due to the thermal stresses which occur. This fracture may be very small or it may be catastrophic depending on the size of the originating inclusion. In many cases, reirradiation of the localized fractures can lead to further fracturing and possible catastrophic failure.

High optical quality glass has been manufactured traditionally in platinum containers. Early laser glasses were produced likewise in platinum crucibles. It soon became evident, however, that microscopic particles of metallic platinum appeared in all glasses made in a platinum crucible, and that those particles served as damage sites to the passage of intense laser beams. Subsequently, it was established that a large part of the platinum contamination in the glasses arose through condensation of platinum oxide from the atmosphere over the glass melt and that this could be greatly reduced by the introduction of dry nitrogen gas instead of air over the molten glass. This led to improved thresholds for damage, but incomplete elimination of the platinum contamination problems. For this reason, the best laser glasses have been manufactured in a platinum-free environment in ceramic crucibles.

However, it has been found that laser glasses which are produced in all ceramic systems are also susceptible to internal damage from inclusions. It has been found that this damage occurs where particles of various ingredients have been reduced to semiconductive or even metallic states.

One approach to solving this problem which has afforded improvement is set forth in the aforementioned copending application. This approach is to assume only strongly oxidizing conditions for the fabrication of laser glasses.

SUMMARY OF THE INVENTION

Accordingly, it is an object of the present invention to provide an improved method for producing laser glasses having high resistance to internal damage caused by inhomogeneities in the laser glass.

A second object of the invention is to provide such a method in which the laser glass produced has a loss coefficient of less than approximately 0.5%/cm.

Another object of the invention is to provide such a method by which the desired laser glasses may be produced utilizing ceramic utensils which have an unknown prior history.

A further object of the invention is to provide laser glass of high optical homogeneity and low bubble content produced in accordance with such a method.

Briefly, the invention, in its broadest aspect, comprises a method for producing laser glasses having high resistance to internal damage and a loss coefficient of less than approximately 0.5%/cm, the laser glass being prepared using ceramic utensils, and the succeeding operations being performed. All of the surfaces of the ceramic utensils which contact the glass during melting are rendered free of reducing components. Laser-glass-forming batch constituents are placed in the ceramic utensils for melting. The batch is melted in the ceramic utensils while oxidizing condition is maintained throughout the batch and over the laser-glass-batch-contacting utensil surfaces. Laser glass is recovered which is resistant to internal damage and has a low loss coefficient.

Further objects, advantages and features of the invention will be apparent from the following detailed specification.

DETAILED DESCRIPTION OF THE PREFERRED EMBODIMENTS

The nature of the submicroscopic inclusions which are found in laser glasses which have been produced in many of the all-ceramic melting systems is not yet understood completely. It appears that the inclusions are particles of either metallic or semiconductive matter which have been reduced. It has been found that the crucible, or other ceramic utensils in contact with the melt, such as the stirrer, either directly introduce reducing components into the melt or contain reducing components on the surfaces thereof which contact the glass during melting and thus produce reduced particles in the glass which are responsible for localized damaging inclusions.

Ceramic utensils of high purity are normally made by slip-casting, which utilizes fluid suspensions of finely divided, high purity materials. In such a process, it is necessary to utilize deflocculents to break up particles. Although inorganic deflocculents are known, generally organic deflocculents, for example, citric acid, are used. In producing crucibles and other ceramic utensils for use in the production of high quality laser glass, according to the present invention, it is preferred that no organic materials, particularly deflocculents be included in the fluid suspensions. The organic materials should be eliminated because of their reducing action during the firing of the ceramic utensils. Furthermore, it is possible that a ceramic utensil may be produced which consists of completely oxidized crystals which are surrounded by an amorphous binder which may act as a reducing agent when in contact with the laser glass melt.

The crucible and other ceramic utensils must be fired under highly oxidizing conditions. This can be achieved readily in flame-fired furnaces as well as in most electrically heated muffle furnaces.

Furthermore, the ceramic utensils must not be contaminated by organic materials during handling and storage. The organic materials to be avoided include body fluids, organic cleaning materials such as industrial and household soaps and detergents, and organic packaging materials such as plastic films, lacquer, and paper.

To acquire a ceramic crucible and the other associated utensils which have a sufficiently well documented history to assure freedom from contamination is difficult. Furthermore, it is difficult to prevent contamination between melts if the utensils are removed from the furnace. Therefore, means must be provided for either restoring or initially rendering the laser-glass batch contacting utensil surfaces of ceramic utensils with an unknown history free of reducing components. Ceramic utensils with an unknown history will be understood to include inorganically prepared utensils which may have been contamined and utensils which may have been produced with organic materials.

Two such treatments have been found for preparing the laser-glass batch contacting surfaces of the ceramic utensils such that they are essentially free of reducing components. The first treatment is to preheat the ceramic utensils in an oxygen atmosphere for an extended period of time. The second treatment includes soaking the utensils in an oxidizing agent for an extended period of time.

The surfaces of the ceramic utensils are prepared, in the first treatment, by preheating the utensils in an oxygen atmosphere for a period of at least 3 days at a temperature of at least 1000°C. However, the best results to date have been acquired by preheating the ceramic utensils to approximately 1400°C and holding the utensils at that temperature for approximately 11 days in what is, in essence, a pure oxygen atmosphere. The oxygen atmosphere is maintained by flushing the furnace at the rate of approximately 5 cubic feet per hour.

The second treatment which has been found for preparing the surfaces of the ceramic utensils provides for immersing the utensils in an oxidizing agent for a period of at least 3 hours. The oxidizing agent which has been found to be most satisfactory is aqua regia, a mineral acid consisting of essentially equal volume parts of concentrated hydrochloric acid (HCl) and concentrated nitric acid ($HNO_3$). However, hydrogen peroxide ($H_2O_2$) in a concentrated solution as well as other mineral acids may also be utilized as oxidizing agents. The most favorable procedure is to immerse the utensils in aqua regia for a period of at least 2 days at room temperature.

In order to ascertain the degree of improvement provided by the aforementioned treatments, a high quality, neodymium doped laser glass was produced in utensils treated according to the aforementioned techniques. The batch constituents of the laser glass are set forth in TABLE I herebelow in grams for a batch which produces approximately 100 pounds of laser glass.

TABLE I

| | |
|---|---|
| $SiO_2$ | 32,889.60 |
| $Na_2CO_3$ | 6,033.60 |
| $K_2CO_3$ | 5,016.00 |
| $KNO_3$ | 4,147.20 |
| $Ba(NO_3)_2$ | 3,998.40 |
| $CeO_2$ | 489.60 |
| $Al(OH)_3$ | 1,123.20 |
| ZnO | 734.40 |
| $Li_2CO_3$ | 1,209.60 |
| $Nd_2O_3$ | 1,440.00 |

The above-stated batch was prepared according to standard weighing and mixing procedures. To avoid dusting and to reduce volatilization losses of batch constituents during the reaction phase of the melt, all batches are pelletized. The batch was filled in portions of approximately 300 grams into a preheated mullite crucible at approximately 1400°C. When the filling and reaction phase was completed, the melt was gradually cooled to approximately 1360°C, at which temperature fining of the melt occurred. This phase lasted approximately 10.5 hours. The ceramic utensils were formed of high purity mullite, which is the preferred composition of the utensils, although high purity alumina and fused silica may also be utilized.

During the succeeding period of approximately 44 hours, the melt was homogenized and conditioned while the batch temperature was lowered to and then maintained at approximately 1110°C. Throughout the fining and homogenizing conditioning phase, the melt was stirred with a mullite stirrer. Finally, the desired laser glass was recovered by cooling to room temperature the homogenized mixture in billets of laser glass, the average size of which was approximately 100 cm in length and 8 cm in diameter.

The billets thus produced had an oxide composition as given in weight percent in TABLE II herebelow.

TABLE II

| | |
|---|---|
| $SiO_2$ | 68.52 |
| $Na_2O$ | 7.35 |
| $K_2O$ | 11.13 |
| BaO | 4.90 |
| $CeO_2$ | 1.02 |
| $Al_2O_3$ | 1.53 |
| ZnO | 1.53 |
| $Li_2O$ | 1.02 |
| $Nd_2O_3$ | 3.00 |

These billets of laser glass were tested according to the procedure set forth in copending application, Ser. No. 47,197, filed June 18, 1970, now U.S. Pat. No. 3,639,066 by J. W. Kantorski and C. G. Young, and which is also assigned to the assignee of the present application. The results of those tests are given in TABLE III herebelow and were attained by using a pulse of 100 nanoseconds duration.

TABLE III

| Crucible Treatment | Damage Threshold (joules/$cm^2$) |
|---|---|
| Untreated | ~ 25 |
| Immersed in aqua regia | > 100 |

TABLE III-continued

| Crucible Treatment | Damage Threshold (joules/cm²) |
| --- | --- |
| Preheat in oxygen | > 100 |

In some billets, the first damage occurred at levels of over 1300 joules/cm² when tested with a laser pulse having a 1 microsecond duration. Therefore, the pretreatment of the ceramic utensils has a beneficial effect on the damage threshold of the laser glasses which were produced. In addition, loss coefficients of less than 0.5%/cm were measured for laser glasses produced in the prepared utensils. In some batches, the loss coefficient measured was only 0.2%/cm.

While there has been described what are considered to be preferred embodiments of the present invention, it will be obvious to those skilled in the art that various changes and modifications may be made therein without departing from the invention.

We claim:

1. The method of producing laser glass having high resistance to internal damage and a loss coefficient of less than 0.5%/centimeter, the glass being prepared using ceramic utensils and comprising the steps of:
preheating the ceramic utensils in an oxygen atmosphere for a period of at least 3 days at a temperature of at least 1000°C so as to render all surfaces of the utensils which contact the glass during melting free of reducing components;
placing laser-glass-forming batch constituents in the ceramic utensils for melting;
melting the batch in the utensils while maintaining an oxidizing condition throughout the batch and over the laser-glass-batch-contacting-utensil surfaces, and
recovering laser glass resistant to internal damage and having a loss coefficient of less than 0.5%/centimeter.

2. A method according to claim 1, in which the ceramic utensils are preheated in a pure oxygen atmosphere for a period of approximately 11 days at a temperature of 1400°C.

3. The method of producing laser glass having high resistance to internal damage and a loss coefficient of less than 0.5%/centimeter, the glass being prepared using ceramic utensils and comprising the steps of:
immersing the ceramic utensils in a concentrated oxidizing agent for a period of at least 3 hours so as to render all surfaces of the utensils which contact the glass during melting free of reducing components;
placing laser-glass-forming batch constituents in the ceramic utensils for melting;
melting the batch in the utensils while maintaining an oxidizing condition throughout the batch and over the laser-glass-batch-contacting-utensil surfaces, and
recovering laser glass resistant to internal damage and having a loss coefficient of less than 0.5%/centimeter.

4. A method according to claim 3, in which the exodizing agent is aqua regia.

5. A method according to claim 4, in which the ceramic utensils are immersed in aqua regia for a period of 2 days at room temperature.

* * * * *